United States Patent
Kouno et al.

(10) Patent No.: US 11,326,073 B1
(45) Date of Patent: May 10, 2022

(54) (METH)ACRYLIC COMPOSITION, PAINT AND CURING AGENT COMPRISING SAME

(71) Applicant: MITSUBISHI GAS CHEMICAL COMPANY, INC., Tokyo (JP)

(72) Inventors: Kazuki Kouno, Kanagawa (JP); Yasuo Kusube, Wakayama (JP); Kazunori Taniguchi, Wakayama (JP); Shohei Nishida, Wakayama (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 0 days.

(21) Appl. No.: 17/605,047

(22) PCT Filed: Apr. 16, 2020

(86) PCT No.: PCT/JP2020/016718
§ 371 (c)(1),
(2) Date: Oct. 20, 2021

(87) PCT Pub. No.: WO2020/218151
PCT Pub. Date: Oct. 29, 2020

(30) Foreign Application Priority Data

Apr. 24, 2019 (JP) .............................. JP2019-083005

(51) Int. Cl.
| | | |
|---|---|---|
| *C09D 133/14* | (2006.01) | |
| *C09D 7/63* | (2018.01) | |
| *C09D 4/00* | (2006.01) | |
| *C08F 20/30* | (2006.01) | |
| *C08K 5/06* | (2006.01) | |

(52) U.S. Cl.
CPC ............ *C09D 133/14* (2013.01); *C08F 20/30* (2013.01); *C08K 5/06* (2013.01); *C09D 4/00* (2013.01); *C09D 7/63* (2018.01)

(58) Field of Classification Search
CPC .......... C09D 133/14; C09D 7/63; C09D 4/00; C08F 20/30; C08K 5/06
USPC ....................................................... 524/755
See application file for complete search history.

(56) References Cited

U.S. PATENT DOCUMENTS

| | | | | |
|---|---|---|---|---|
| 2007/0282087 | A1* | 12/2007 | Irisawa .............. | C09K 19/3852 526/248 |
| 2011/0236595 | A1* | 9/2011 | Kodama ................... | C08F 2/48 522/182 |
| 2015/0151022 | A1* | 6/2015 | Jiang ....................... | A61L 27/16 526/279 |
| 2019/0031799 | A1 | 1/2019 | Kouno | |
| 2019/0338157 | A1 | 11/2019 | Kouno | |

FOREIGN PATENT DOCUMENTS

| | | |
|---|---|---|
| JP | 2010-248358 A | 11/2010 |
| JP | 2011-126991 A | 6/2011 |
| JP | 2012-82386 A | 4/2012 |
| JP | 2012-82387 A | 4/2012 |
| JP | 2012-219205 A | 11/2012 |
| JP | 2013-53310 A | 3/2013 |
| JP | 2014-185337 A | 10/2014 |
| WO | WO 2016/108491 A1 | 7/2016 |
| WO | WO 2017/135066 A1 | 8/2017 |
| WO | WO 2018/025537 A1 | 2/2018 |

OTHER PUBLICATIONS

ISR for PCT/JP2020/016718, dated Jul. 7, 2020.

* cited by examiner

*Primary Examiner* — Kelechi C Egwim
(74) *Attorney, Agent, or Firm* — Greenblum & Bernstein, P.L.C.

(57) ABSTRACT

The present invention provides: a composition which has a low viscosity, a high refractive index when being cured, and in which the precipitation of crystals is suppressed for a long time when stored at a low temperature; and a paint comprising the same. According to one embodiment of the present invention, provided is a composition which includes: a (meth)acrylate represented by general formula (1); and a compound represented by general formula (2), wherein the mass percentage of the content of the (meth)acrylate to the content of the compound represented by general formula (2) is 60:40 to 90:10 (exclusive of 60:40 and 90:10).

12 Claims, No Drawings

(METH)ACRYLIC COMPOSITION, PAINT AND CURING AGENT COMPRISING SAME

TECHNICAL FIELD

The present invention relates to a (meth)acrylic composition, and a coating material containing the same. Furthermore, the present invention also relates to a cured body of said composition.

BACKGROUND ART

In recent years, resin materials are widely used in optical components, such as optic overcoating agents, hard coating agents, antireflection films, spectacle lenses, optical fibers, optical waveguides, and holograms, because of their excellent workability and productivity. Further, in the field of optical components, the tendency of miniaturization and thinning has increased, and materials having high refractive indices are accordingly required. Against such requirements, coating materials including resin compositions having high refractive indices when cured are widely used. However, such coating materials generally have relatively high viscosities, and this characteristic causes a difficulty in thin coating in some cases. Accordingly, it has been proposed a composition having a low viscosity improved in this point.

For example, Patent Literature 1 proposes a composition having a high refractive index and a low viscosity by mixing o-phenylbenzyl acrylate (OPBA, or 2-phenylbenzyl acrylate) and p-phenylbenzyl acrylate (PPBA, or 4-phenylbenzyl acrylate), isomers of phenylbenzyl acrylate, at a specific ratio. Patent Literature 2 describes that a composition having a high refractive index and a low viscosity can be prepared by mixing phenylbenzyl acrylate with a difunctional (meth)acrylate or diphenyl derivative.

Patent Literatures 3 to 7 describe that a resin composition that can be used as an optical material was obtained by mixing a phenoxybenzyl (meth)acrylate and a high-refractive-index polyfunctional (meth)acrylate (a fluorene-based bisphenol derivative or a bisphenol A derivative).

PRIOR ART DOCUMENTS

Patent Documents

Patent Literature 1: Japanese Unexamined Patent Application Publication No. 2012-82387
Patent Literature 2: Japanese Unexamined Patent Application Publication No. 2012-82386
Patent Literature 3: Japanese Unexamined Patent Application Publication No. 2010-248358
Patent Literature 4: Japanese Unexamined Patent Application Publication No. 2011-126991
Patent Literature 5: Japanese Unexamined Patent Application Publication No. 2012-219205
Patent Literature 6: Japanese Unexamined Patent Application Publication No. 2013-53310
Patent Literature 7: Japanese Unexamined Patent Application Publication No. 2014-185337

SUMMARY OF INVENTION

Technical Problem

As described above, various compositions having a high refractive index and a low viscosity have been proposed. However, a monofunctional (meth)acrylate with a low viscosity usually have a low refractive index while a monofunctional (meth)acrylate with a high refractive index may not be effective enough to reduce viscosity of a high-refractive-index polyfunctional (meth)acrylate. Moreover, in order to prevent polymerization reaction or the like of such a composition during storage, the composition generally needs to be stored at a temperature lower than or equal to room temperature (specifically, 0° C. or lower). In this case, however, storage at low temperature can cause crystal precipitation in the composition and is therefore difficult.

Under such circumstances, there has been an ongoing need for a (meth)acrylate composition which has a high refractive index and a low viscosity and in which occurrence of crystal precipitation is suppressed during storage at a low temperature.

Solution to Problem

The present inventors have gone through extensive research, and as a result of which found that a (meth)acrylate composition which has a high refractive index and a low viscosity and in which crystal precipitation is suppressed during storage at a low temperature can be obtained by mixing a (meth)acrylate having a specific structure with a compound represented by General formula (2) below:

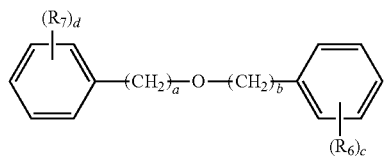

in a specific mass ratio, thereby accomplishing the present invention.

Thus, the present invention is characterized as follows.

[1]

A composition comprising:

(A) a (meth)acrylate represented by General formula (1) below:

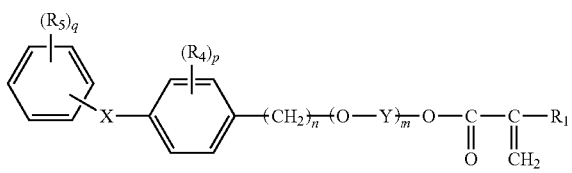

wherein

X is a single bond or a divalent group selected from the group consisting of —$C(R_2)(R_3)$—, —$C(=O)$—, —O—, —$OC(=O)$—, —$OC(=O)O$—, —S—, —SO—, —$SO_2$— and any combination thereof; wherein, $R_2$ and $R_3$ are each independently a hydrogen atom, a linear alkyl group having 1 to 10 carbon atoms, a branched alkyl group having 3 to 10 carbon atoms, a cyclic alkyl group having 3 to 10 carbon atoms, a linear alkoxy group having 1 to 10 carbon atoms, a branched alkoxy group having 3 to 10 carbon atoms, a cyclic alkoxy group having 3 to 10 carbon atoms, a phenyl group or a biphenyl group; or $R_2$ and $R_3$ are optionally linked to each other to, together with the carbon atom to which they are attached, form a cyclic alkyl group having 3 to 10 carbon atoms;

Y is an optionally branched alkylene group having 2 to 6 carbon atoms, a cycloalkylene group having 6 to 10 carbon atoms or an arylene group having 6 to 10 carbon atoms;

$R_1$ is a hydrogen atom or a methyl group;

$R_4$ and $R_5$ are each independently a linear alkyl group having 1 to 10 carbon atoms, a branched alkyl group having 3 to 10 carbon atoms, a cyclic alkyl group having 3 to 10 carbon atoms, a linear alkoxy group having 1 to 10 carbon atoms, a branched alkoxy group having 3 to 10 carbon atoms, a cyclic alkoxy group having 3 to 10 carbon atoms, a halogen atom, a phenyl group or a biphenyl group;

m is an integer of 0 to 10;

n is an integer of 1 to 2;

p is an integer of 0 to 4; and q is an integer of 0 to 5; and by General formula (1) and the content of the compound represented by General formula (2) is 65:35 to 85:15.

[4]

The composition according to any one of [1] to [3], wherein a and b in General formula (2) above are each an integer of 0 to 5.

[5]

The composition according to any one of [1] to [4], wherein $R_6$ and $R_7$ in General formula (2) above are each a phenyl group, a biphenyl group or a phenoxy group.

[6]

The composition according to [5], wherein a, b, c and d in General formula (2) above are all 1.

[7]

The composition according to any one of [1] to [6], further comprising a polyvalent vinyl monomer copolymerizable with the (meth)acrylate represented by General formula (1) above and represented by General formula (3) below:

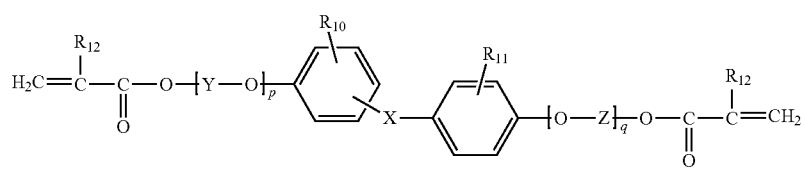

(3)

(B) a compound represented by General formula (2) below:

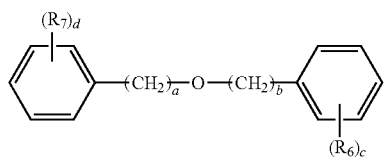

(2)

wherein $R_6$ and $R_7$ are each independently a hydrogen atom, a linear alkyl group having 1 to 10 carbon atoms, a branched alkyl group having 3 to 10 carbon atoms, a cyclic alkyl group having 3 to 10 carbon atoms, a linear alkoxy group having 1 to 10 carbon atoms, a branched alkoxy group having 3 to 10 carbon atoms, a cyclic alkoxy group having 3 to 10 carbon atoms, a halogen atom, a phenyl group, a biphenyl group, a phenoxy group, —$R_8$OH or —($R_9$)$_s$H; wherein, $R_8$ is a linear alkylene group having 1 to 10 carbon atoms or a branched alkylene group having 3 to 10 carbon atoms, $R_9$ is a linear alkyleneoxy group having 1 to 10 carbon atoms or a branched alkyleneoxy group having 3 to 10 carbon atoms, and s is an integer of 1 to 5;

a and b are each independently an integer of 0 to 10; and c and d are each independently an integer of 0 to 5;

wherein the mass ratio between the content of the (meth)acrylate represented by General formula (1) and the content of the compound represented by General formula (2) is more than 60:40 and less than 90:10.

[2]

The composition according to [1], wherein p and q in General formula (1) above are both 0.

[3]

The composition according to [1] or [2], wherein the mass ratio between the content of the (meth)acrylate represented wherein $R_{10}$ and $R_{11}$ are each independently selected from a hydrogen atom, an alkyl group having 1 to 20 carbon atoms, an alkoxyl group having 1 to 20 carbon atoms, a cycloalkyl group having 3 to 20 carbon atoms, a cycloalkoxyl group having 5 to 20 carbon atoms, an aryl group having 6 to 20 carbon atoms, an aryloxy group having 6 to 20 carbon atoms or a halogen atom;

$R_{12}$ is a hydrogen atom or a methyl group;

X represents any structure selected from the group consisting of a single bond, —O—, —S—, —SO—, —SO$_2$—, —CO— and those represented by General formulae (4) to (7) below;

Y and Z are each independently an optionally branched alkylene group having 2 to 6 carbon atoms, a cycloalkylene group having 6 to 10 carbon atoms or an arylene group having 6 to 10 carbon atoms, and p and q are each independently an integer of 0 to 4;

(4)

wherein $R_{13}$ and $R_{14}$ each independently represent any one of the group consisting of a hydrogen atom, a halogen atom, an alkyl group having 1 to 20 carbon atoms optionally having a substituent, an alkoxy group having 1 to 5 carbon atoms optionally having a substituent, an aryl group having 6 to 12 carbon atoms optionally having a substituent, an alkenyl group having 2 to 5 carbon atoms optionally having a substituent and an aralkyl group having 7 to 17 carbon atoms optionally having a substituent;

the substituents are each independently a halogen atom, an alkyl group having 1 to 20 carbon atoms or an aryl group having 6 to 12 carbon atoms, and c represents an integer of 1 to 20;

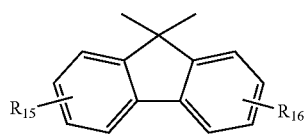

(5)

wherein $R_{15}$ and $R_{16}$ each independently represent any one of the group consisting of a hydrogen atom, a halogen atom, an alkyl group having 1 to 20 carbon atoms optionally having a substituent, an alkoxy group having 1 to 5 carbon atoms optionally having a substituent, an aryl group having 6 to 12 carbon atoms optionally having a substituent, an alkenyl group having 2 to 5 carbon atoms optionally having a substituent and an aralkyl group having 7 to 17 carbon atoms optionally having a substituent, or $R_{15}$ and $R_{16}$ are linked each other to form a carbocyclic or heterocyclic ring having 1 to 20 carbon atoms; and the substituents are each independently a halogen atom, an alkyl group having 1 to 20 carbon atoms or an aryl group having 6 to 12 carbon atoms;

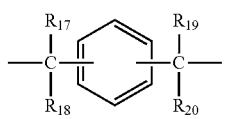

(6)

wherein $R_{17}$-$R_{20}$ each independently represent any one of the group consisting of a hydrogen atom, a halogen atom, an alkyl group having 1 to 20 carbon atoms optionally having a substituent, an alkoxy group having 1 to 5 carbon atoms optionally having a substituent, an aryl group having 6 to 12 carbon atoms optionally having a substituent, an alkenyl group having 2 to 5 carbon atoms optionally having a substituent and an aralkyl group having 7 to 17 carbon atoms optionally having a substituent, or $R_{17}$ and $R_{18}$, and $R_{19}$ and $R_{20}$ are linked each other to form a carbocyclic or heterocyclic ring having 1 to 20 carbon atoms; and the substituents are each independently a halogen atom, an alkyl group having 1 to 20 carbon atoms or an aryl group having 6 to 12 carbon atoms; and

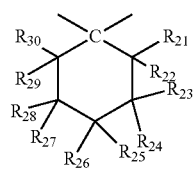

(7)

wherein $R_{21}$-$R_{30}$ are each independently a hydrogen atom or an alkyl group having 1 to 3 carbon atoms.

[8]
The composition according to [7], comprising the polyvalent vinyl monomer represented by General formula (3) in an amount of 20% to 80% by weight relative to the total weight of the composition.

[9]
The composition according to [7] or [8], wherein X in General formula (3) above has a structure represented by General formula (4) or a structure represented by General formula (5).

[10]
The composition according to any one of [1] to [9], wherein the composition is an active energy ray-curable composition.

[11]
A coating material comprising the composition according to any one of [1] to [10].

[12]
A cured body obtained by curing the composition according to any one of [1] to [10].

Effects of Invention

The present invention can provide a composition which has a low viscosity, which can realize a high refractive index once cured and in which crystal precipitation is suppressed during storage at a low temperature, and a coating material containing the same. In addition, the present invention can also provide a cured body of this composition.

DESCRIPTION OF EMBODIMENTS

Hereinafter, an embodiment of the present invention will be described in detail.
<Composition>
A composition of the present invention comprises:
(A) a (meth)acrylate represented by General formula (1) below:

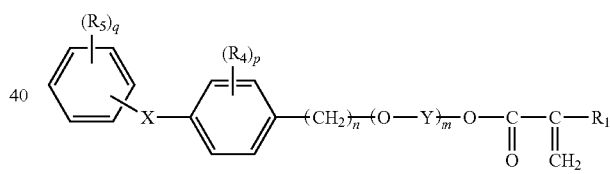

(1)

wherein
X is a single bond or a divalent group selected from the group consisting of —C($R_2$)($R_3$)—, —C(=O)—, —O—, —OC(=O)—, —OC(=O)O—, —S—, —SO—, —SO$_2$— and any combination thereof; wherein, $R_2$ and $R_3$ are each independently a hydrogen atom, a linear alkyl group having 1 to 10 carbon atoms, a branched alkyl group having 3 to 10 carbon atoms, a cyclic alkyl group having 3 to 10 carbon atoms, a linear alkoxy group having 1 to 10 carbon atoms, a branched alkoxy group having 3 to 10 carbon atoms, a cyclic alkoxy group having 3 to 10 carbon atoms, a phenyl group or a biphenyl group; or $R_2$ and $R_3$ are optionally linked to each other to, together with the carbon atom to which they are attached, form a cyclic alkyl group having 3 to 10 carbon atoms;

Y is an optionally branched alkylene group having 2 to 6 carbon atoms, a cycloalkylene group having 6 to 10 carbon atoms or an arylene group having 6 to 10 carbon atoms;

$R_1$ is a hydrogen atom or a methyl group;

$R_4$ and $R_5$ are each independently a linear alkyl group having 1 to 10 carbon atoms, a branched alkyl group having 3 to 10 carbon atoms, a cyclic alkyl group having 3 to 10 carbon atoms, a linear alkoxy group having 1 to 10 carbon atoms, a branched alkoxy group having 3 to 10 carbon atoms, a cyclic alkoxy group having 3 to 10 carbon atoms, a halogen atom, a phenyl group or a biphenyl group;

m is an integer of 0 to 10;
n is an integer of 1 to 2;
p is an integer of 0 to 4; and
q is an integer of 0 to 5; and
(B) a compound represented by General formula (2) below:

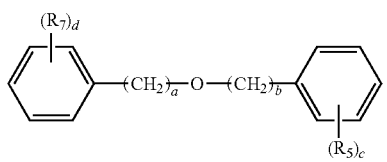

(2)

wherein
$R_6$ and $R_7$ are each independently a hydrogen atom, a linear alkyl group having 1 to 10 carbon atoms, a branched alkyl group having 3 to 10 carbon atoms, a cyclic alkyl group having 3 to 10 carbon atoms, a linear alkoxy group having 1 to 10 carbon atoms, a branched alkoxy group having 3 to 10 carbon atoms, a cyclic alkoxy group having 3 to 10 carbon atoms, a halogen atom, a phenyl group, a biphenyl group, —$R_8$OH or —($R_9$)$_s$H; wherein, $R_8$ is a linear alkylene group having 1 to 10 carbon atoms or a branched alkylene group having 3 to 10 carbon atoms, $R_9$ is a linear alkyleneoxy group having 1 to 10 carbon atoms or a branched alkyleneoxy group having 3 to 10 carbon atoms, and s is an integer of 1 to 5;

a and b are each independently an integer of 0 to 10; and
c and d are each independently an integer of 0 to 5;
wherein the mass ratio between the content of the (meth)acrylate represented by General formula (1) and the content of the compound represented by General formula (2) is more than 60:40 and less than 90:10.

As described above, the composition of the present invention which contains a (meth)acrylate having the structure of General formula (1) and a compound having the structure of General formula (2) in a predetermined mass ratio has a low viscosity and a high refractive index once cured, and crystal precipitation in this composition is suppressed during storage at a low temperature. While not wishing to be bound by theory, it is considered that when the compound having the structure of General formula (2) is contained in a predetermined amount relative to the (meth)acrylate having the structure of General formula (1), not only the viscosity of the composition can be reduced but also crystal growth can be suppressed.

The refractive index of the composition of the present invention, when measured using multiwavelength Abbe refractometer DR-M2 (manufactured by Atago Co., Ltd.) at a wavelength of 589 nm and a temperature of 23° C., is preferably 1.580 or higher, more preferably 1.585 or higher, and still more preferably 1.590 or higher.

The viscosity of the composition of the present invention, when measured using E-type viscometer (Model TV-22) at a temperature of 25° C., is preferably lower than 10,000 mPa·s, more preferably 5,000 mPa·s or lower, and still more preferably 5 to 2,100 mPa·s.

Hereinafter, each of the components contained in the composition of the present invention will be described in order.

1. (Meth)acrylate
The (meth)acrylate used in the composition of the present invention has a structure represented by General formula (1) below.

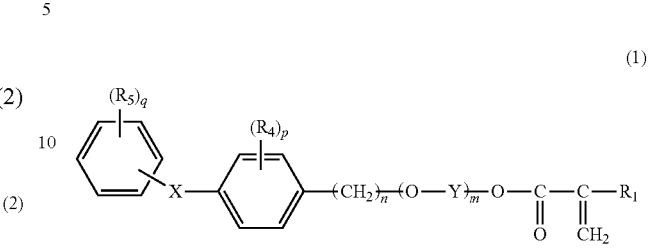

(1)

In Formula (1), X is a single bond or a divalent group selected from the group consisting of —C($R_2$)($R_3$)—, —C(=O)—, —O—, —OC(=O)—, —OC(=O)O—, —S—, —SO—, —SO$_2$— and any combination thereof, and preferably a single bond or a divalent group selected from the group consisting of —C($R_2$)($R_3$)—, —O—, and any combination thereof. Here, $R_2$ and $R_3$ are each independently a hydrogen atom, a linear alkyl group having 1 to 10 carbon atoms, a branched alkyl group having 3 to 10 carbon atoms, a cyclic alkyl group having 3 to 10 carbon atoms, a linear alkoxy group having 1 to 10 carbon atoms, a branched alkoxy group having 3 to 10 carbon atoms, a cyclic alkoxy group having 3 to 10 carbon atoms, a phenyl group or a biphenyl group. Alternatively, $R_2$ and $R_3$ are optionally linked to each other to, together with the carbon atom to which they are attached, form a cyclic alkyl group having 3 to 10 carbon atoms. Preferably, $R_2$ and $R_3$ are both hydrogen atoms.

Y is an optionally branched alkylene group having 2 to 6 carbon atoms, a cycloalkylene group having 6 to 10 carbon atoms or an arylene group having 6 to 10 carbon atoms.

$R_1$ is a hydrogen atom or a methyl group, preferably a hydrogen atom.

$R_4$ and $R_5$ are each independently a linear alkyl group having 1 to 10 carbon atoms, a branched alkyl group having 3 to 10 carbon atoms, a cyclic alkyl group having 3 to 10 carbon atoms, a linear alkoxy group having 1 to 10 carbon atoms, a branched alkoxy group having 3 to 10 carbon atoms, a cyclic alkoxy group having 3 to 10 carbon atoms, a halogen atom, a phenyl group or a biphenyl group.

m is an integer of 0 to 10, preferably an integer of 0 to 5, and more preferably 0.

n is an integer of 1 to 2, and preferably 1.

p is an integer of 0 to 4, preferably an integer of 0 to 2, and more preferably 0.

q is an integer of 0 to 5, preferably an integer of 0 to 2, and more preferably 0.

Still more preferably, p and q are both 0.

Examples of the above-described (meth)acrylate represented by General formula (1) include 4-phenylbenzyl (meth)acrylate, 3-phenylbenzyl (meth)acrylate, 2-phenylbenzyl (meth)acrylate, 4-biphenylbenzyl (meth)acrylate, 3-biphenylbenzyl (meth)acrylate, 2-biphenylbenzyl (meth)acrylate, 4-benzylbenzyl (meth)acrylate, 3-benzylbenzyl (meth)acrylate, 2-benzylbenzyl (meth)acrylate, 4-phenethylbenzyl (meth)acrylate, 3-phenethylbenzyl (meth)acrylate, 2-phenethylbenzyl (meth)acrylate, 4-phenethylphenethyl (meth)acrylate, 3-phenethylphenethyl (meth)acrylate, 2-phenethylphenethyl (meth)acrylate, 4-(4-methylphenyl)benzyl (meth)acrylate, 3-(4-methylphenyl)benzyl (meth)acrylate, 2-(4-methylphenyl)benzyl (meth)acrylate, 4-(4-methoxyphenyl)benzyl (meth)acrylate, 3-(4- methoxyphenyl)benzyl (meth)acrylate, 2-(4-methoxyphenyl)benzyl (meth)acrylate, 4-(4-bromophenyl)benzyl (meth)acrylate, 3-(4-bromophenyl)benzyl (meth)acrylate, 2-(4-bromophenyl)benzyl (meth)acrylate, 4-benzoylbenzyl (meth)acrylate, 3-benzoylbenzyl (meth)acrylate, 2-benzoylbenzyl (meth)acrylate, 4-(phenylsulfinyl)benzyl (meth)acrylate, 3-(phenylsulfinyl)benzyl (meth)acrylate, 2-(phenylsulfinyl)benzyl (meth)acrylate, 4-(phenylsulfonyl)benzyl (meth)acrylate, 3-(phenylsulfonyl)benzyl (meth)acrylate, 2-(phenylsulfonyl)benzyl (meth)acrylate, 4-((phenoxycarbonyl)oxy)benzyl (meth)acrylate, 3-((phenoxycarbonyl)oxy)benzyl (meth)acrylate, 2-((phenoxycarbonyl)oxy)benzyl (meth)acrylate, 4-(((meth)acryloxy)methyl)phenyl benzoate, 3-(((meth)acryloxy)methyl)phenyl benzoate, 2-(((meth)acryloxy)methyl)phenyl benzoate, phenyl 4-(((meth)acryloxy)methyl)benzoate, phenyl 3-(((meth)acryloxy)methyl)benzoate, phenyl 2-(((meth)acryloxy)methyl)benzoate, 4-(1-phenylcyclohexyl)benzyl (meth)acrylate, 3-(1-phenylcyclohexyl)benzyl (meth)acrylate, 2-(1-phenylcyclohexyl)benzyl (meth)acrylate, 4-phenoxybenzyl (meth)acrylate, 3-phenoxybenzyl (meth)acrylate, 2-phenoxybenzyl (meth)acrylate, 4-(phenylthio)benzyl (meth)acrylate, 3-(phenylthio)benzyl (meth)acrylate, 2-(phenylthio)benzyl (meth)acrylate and 3-methyl-4-(2-methylphenyl)benzyl methacrylate. A single kind or two or more kinds of them can be used alone or in combination. Among them, 2-phenylbenzyl (meth)acrylate, 4-phenylbenzyl(meth)acrylate, 4-phenoxybenzyl(meth)acrylate and 4-benzylbenzyl(meth)acrylate are preferable, and 2-phenylbenzyl acrylate, 4-phenylbenzyl acrylate, 4-phenoxybenzyl acrylate and 4-benzylbenzyl acrylate are more preferable.

The mass ratio between the (meth)acrylate represented by General formula (1) and the compound represented by General formula (2) described below contained in the composition of the present invention is more than 60:40 and less than 90:10. By keeping the mass ratio between these compounds to lie within the above-mentioned range, crystal precipitation can be suppressed effectively during storage at a low temperature while realizing a high refractive index and a low viscosity. The above-described mass ratio is preferably 65:35 to 85:15 and more preferably 68:32 to 82:18.

In one aspect of the present invention, the mass ratio between the (meth)acrylate represented by General formula (1) and the compound represented by General formula (2) described below contained in the composition of the present invention may also be 70:30 to 89:11, 75:25 to 86:14, 78:22 to 84:16 or 84:16 to 86:14.

2. Compound Represented by General Formula (2)

The compound represented by General formula (2) used in the composition of the present invention has the following structure.

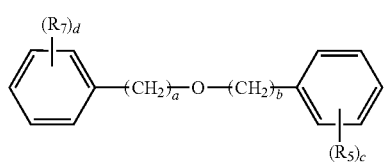

(2)

In General formula (2), $R_6$ and $R_7$ are each independently a hydrogen atom, a linear alkyl group having 1 to 10 carbon atoms, a branched alkyl group having 3 to 10 carbon atoms, a cyclic alkyl group having 3 to 10 carbon atoms, a linear alkoxy group having 1 to 10 carbon atoms, a branched alkoxy group having 3 to 10 carbon atoms, a cyclic alkoxy group having 3 to 10 carbon atoms, a halogen atom, a phenyl group, a biphenyl group, a phenoxy group, —$R_8$OH or —$(R_9)_s$H, preferably a hydrogen atom, a linear alkyl group having 1 to 10 carbon atoms, a phenyl group, a biphenyl group or a phenoxy group, and more preferably a phenyl group, a biphenyl group or a phenoxy group. In a preferred aspect of the present invention, $R_6$ and $R_7$ are each a phenyl group, a biphenyl group or a phenoxy group.

Here, $R_8$ is a linear alkylene group having 1 to 10 carbon atoms or a branched alkylene group having 3 to 10 carbon atoms, $R_9$ is a linear alkyleneoxy group having 1 to 10 carbon atoms or a branched alkyleneoxy group having 3 to 10 carbon atoms, and s is an integer of 1 to 5.

a and b are each independently an integer of 0 to 10, preferably an integer of 0 to 5, and more preferably 1 or 2.

c and d are each independently an integer of 0 to 5, preferably an integer of 0 to 3, and more preferably 0 or 1. When c is 0, the benzene ring has no substituent at $R_6$. The same also applies to d.

In a preferred aspect of the present invention, a, b, c and d are all 1.

In Formula (2), —$(R_9)_s$H is preferably —$(CH_2CH_2O)$—H, —$(CH_2CH_2O)_2$—H, —$(CH_2CH(CH_3)O)$—H or —$(CH_2CH(CH_3)O)_2$—H.

Examples of the above-described compound represented by General formula (2) include oxybis(methylene)dibenzene, 4,4'-oxybis(methylene)dibiphenyl, 3,3'-oxybis(methylene)dibiphenyl, 2,2'-oxybis(methylene)dibiphenyl, oxybis(methylene)dibenzene, oxydibenzene, 4,4'-oxydibiphenyl, 3,3'-oxydibiphenyl, 2,2'-oxydibiphenyl, 4,4'-(oxybis(methylene))bis(phenoxybenzene), 3,3% (oxybis(methylene))bis(phenoxybenzene) and 2,2% (oxybis(methylene))bis(phenoxybenzene). A single kind or two or more kinds of them can be used alone or in combination. Among them, 4,4'-oxybis(methylene)dibiphenyl, oxybis(methylene)dibenzene or oxydibenzene is preferable.

As long as a predetermined amount of the compound represented by General formula (2) is contained in the composition of the present invention, the means of presence thereof does not matter. Specifically, a predetermined amount of the compound represented by General formula (2) may be added to the (meth)acrylate represented by General formula (1), or the compound represented by General formula (2) may be present in the composition of the present invention by adjusting the conditions for synthesizing the (meth)acrylate represented by General formula (1) so as to simultaneously generate the compound represented by General formula (2).

3. Polyvalent Vinyl Monomer

Optionally, the composition of the present invention may further contain a polyvalent vinyl monomer represented by General formula (3) below which is copolymerizable with the (meth)acrylate represented by General formula (1) above.

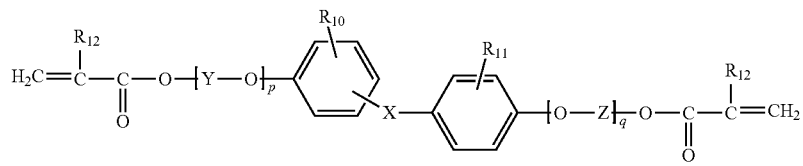
(3)

In Formula (3), $R_{10}$ and $R_{11}$ are each independently selected from a hydrogen atom, an alkyl group having 1 to 20 carbon atoms, an alkoxyl group having 1 to 20 carbon atoms, a cycloalkyl group having 3 to 20 carbon atoms, a cycloalkoxyl group having 5 to 20 carbon atoms, an awl group having 6 to 20 carbon atoms, an aryloxy group having 6 to 20 carbon atoms or a halogen atom, and they are each preferably a hydrogen atom.

$R_{12}$ is a hydrogen atom or a methyl group.

X represents any structure selected from the group consisting of a single bond, —O—, —S—, —SO—, —SO$_2$—, —CO— and those represented by General formulae (4) to (7) below.

Y and Z are each independently an optionally branched alkylene group having 2 to 6 carbon atoms, a cycloalkylene group having 6 to 10 carbon atoms or an arylene group having 6 to 10 carbon atoms.

p and q are each independently an integer of 0 to 4, where p and q are preferably both 0 or 1.

In Formula (4) below,

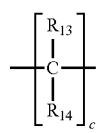
(4)

$R_{13}$ and $R_{14}$ each independently represent any one of the group consisting of a hydrogen atom, a halogen atom, an alkyl group having 1 to 20 carbon atoms optionally having a substituent, an alkoxy group having 1 to 5 carbon atoms optionally having a substituent, an awl group having 6 to 12 carbon atoms optionally having a substituent, an alkenyl group having 2 to 5 carbon atoms optionally having a substituent and an aralkyl group having 7 to 17 carbon atoms optionally having a substituent, wherein the substituents are each independently a halogen atom, an alkyl group having 1 to 20 carbon atoms or an awl group having 6 to 12 carbon atoms. Preferably, $R_{13}$ and $R_{14}$ are both hydrogen atoms.

c represents an integer of 1 to 20, preferably an integer of 1 to 10, and more preferably an integer of 1 to 5.

In Formula (5) below,

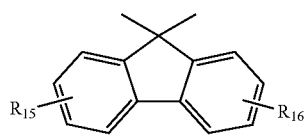
(5)

$R_{15}$ and $R_{16}$ each independently represent any one of the group consisting of a hydrogen atom, a halogen atom, an alkyl group having 1 to 20 carbon atoms optionally having a substituent, an alkoxy group having 1 to 5 carbon atoms optionally having a substituent, an aryl group having 6 to 12 carbon atoms optionally having a substituent, an alkenyl group having 2 to 5 carbon atoms optionally having a substituent and an aralkyl group having 7 to 17 carbon atoms optionally having a substituent, or $R_{15}$ and $R_{16}$ are linked each other to form a carbocyclic or heterocyclic ring having 1 to 20 carbon atoms, wherein the substituents are each independently a halogen atom, an alkyl group having 1 to 20 carbon atoms or an awl group having 6 to 12 carbon atoms. Preferably, $R_{15}$ and $R_{16}$ are both hydrogen atoms.

In Formula (6) below,

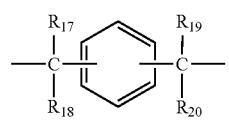
(6)

$R_{17}$-$R_{20}$ each independently represent any one of the group consisting of a hydrogen atom, a halogen atom, an alkyl group having 1 to 20 carbon atoms optionally having a substituent, an alkoxy group having 1 to 5 carbon atoms optionally having a substituent, an awl group having 6 to 12 carbon atoms optionally having a substituent, an alkenyl group having 2 to 5 carbon atoms optionally having a substituent and an aralkyl group having 7 to 17 carbon atoms optionally having a substituent, or $R_{17}$ and $R_{18}$, and $R_{19}$ and $R_{20}$ are linked each other to form a carbocyclic or heterocyclic ring having 1 to 20 carbon atoms, and the substituents are each independently a halogen atom, an alkyl group having 1 to 20 carbon atoms or an awl group having 6 to 12 carbon atoms. Preferably, $R_{17}$-$R_{20}$ are all hydrogen atoms.

In Formula (7) below,

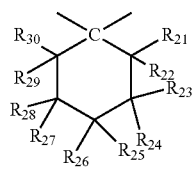
(7)

$R_{21}$-$R_{30}$ are each independently a hydrogen atom or an alkyl group having 1 to 3 carbon atoms. Preferably, $R_{21}$-$R_{30}$ are all hydrogen atoms.

In Formula (3) above, X preferably has a structure represented by General formula (4) or a structure represented by General formula (5).

Examples of the above-described polyvalent vinyl monomer represented by General formula (3) include 9,9-bis[4-(2-(meth)acryloyloxyethoxy)phenyl]fluorene, 4,4'-isopropylidenediphenol di(meth)acrylate, 2,2'-bis[4-(2-(meth) acryloyloxyethoxy)phenyl]propane, bis[4-(2-(meth)

acryloyloxyethoxy)phenyl]methane, 1,1'-bis[4-(2-(meth) acryloyloxyethoxy)phenyl]methane, bis[4-(2-(meth) acryloyloxyethoxy)phenyl]ether, bis[4-(2-(meth) acryloyloxyethoxy)phenyl]sulfoxide, bis[4-(2-(meth) acryloyloxyethoxy)phenyl]sulfide, bis(4-(2-(meth) (meth) acryloyloxyethoxy)phenyl]sulfone, bis[4-(2-(meth) acryloyloxyethoxy)phenyl]ketone, ethoxylated bisphenol A diacrylate and 4,4% di(meth)acryloyloxy biphenyl. Among them, 9,9-bis[4-(2-(meth)acryloyloxyethoxy)phenyl]fluorene, 4,4'-isopropylidenediphenol di(meth)acrylate, ethoxylated bisphenol A diacrylate and 2,2'-bis[4-(2-(meth)acryloyloxyethoxy)phenyl]propane are preferable, and ethoxylated bisphenol A diacrylate and 9,9-bis[4-(2-(meth) acryloyloxyethoxy)phenyl]fluorene are more preferable. Moreover, among the polyvalent vinyl monomers represented by General formula (3) listed above, examples of commercially available products include, but not limited to, ABE-300, A-BPE-4 and A-BPEF manufactured by Shin-Nakamura Chemical Co., Ltd., Light Acrylate BP-4EAL manufactured by Kyoeisha Chemical Co., Ltd., Viscoat #700HV manufactured by Shin-Nakamura Chemical Co., Ltd., and FA-324A manufactured by Hitachi Chemical Company, Ltd.

The amount of the polyvalent vinyl monomer represented by General formula (3) blended is preferably 20% to 80% by weight, more preferably 30% to 80% by weight and still more preferably 40% to 80% by weight relative to the total weight of the composition of the present invention. Blending of the polyvalent vinyl monomer in an amount of 20% to 80% by weight allows sufficient cross-linking to proceed with a workable viscosity and a high refractive index.

4. Optional Additives

The composition of the present invention can include various optional additives depending on the application within a range not departing from the gist of the present invention, in addition to the above-described components. Such an additive is, for example, at least one selected from the group consisting of a heat stabilizer, an antioxidant, a flame retardant, a flame retardant auxiliary, an ultraviolet absorber, a mold release agent, and a colorant. The amount of the additives is preferably 0.005 to 0.1 parts by mass, more preferably 0.01 to 0.05 parts by mass, per 100 parts by mass in total of the (meth)acrylate represented by Formula (1) and the compound represented by Formula (2).

The composition of the present invention can be produced by any known method, and may be prepared by simply mixing the above-described components.

The composition of the present invention can be cured by a variety of methods. The composition of the present invention is preferably an active energy ray-curable composition, and the details are described later.

<Coating Material>

The coating material includes the above-described composition. The coating material of the present invention can be mainly used in, for example, coating agents or hard coating agents for optical members.

A coating material of the present invention applied to a general substrate, such as a plastic substrate, may contain a wetting agent, such as silicone or an acrylic compound, for enhancing wetting of the surface of the substrate. Preferred examples of the wetting agent include BYK331, BYK333, BYK340, BYK347, BYK348, BYK378, BYK380, and BYK381 available from BYK-Chemie. The amount of such a wetting agent in the coating material is preferably within a range of 0.01% to 2.0% by mass based on the total mass of the coating material.

In order to improve the adhesiveness to various materials, the coating material may contain a tackifier, such as a xylene resin, a terpene resin, a phenolic resin, and a rosin resin, as needed. The amount of such a tackifier is preferably within a range of 0.01% to 2.0% by mass based on the total mass of the coating material.

In order to improve the adhesiveness to various materials, the coating material may contain a coupling agent, such as a silane coupling agent and a titan coupling agent. The amount of such a coupling agent is preferably within a range of 0.01% to 5.0% by mass based on the total mass of the coating material.

In order to improve various performances, such as shock resistance, the coating material may contain an inorganic filler, such as silica, alumina, mica, talc, aluminum flakes, and glass flakes. The amount of such a filler is preferably within a range of 0.01% to 10.0% by mass based on the total amount of the coating material.

Furthermore, when the coating material of the present invention is applied to a general substrate, such as a metal, concrete, or plastic substrate, the coating material may contain a defoaming agent of a silicone or acrylic compound for enhancing disappearance of foam being generated during stirring and mixing or coating. Preferred examples of the defoaming agent include BYK019, BYK052, BYK065, BYK066N, BYK067N, BYK070, and BYK080 available from BYK-Chemie, and BYK065 is particularly preferred. The amount of such a defoaming agent is within a range of 0.01% to 3.0% by mass based on the total mass of the coating material.

The coating material of the present invention may include, as needed, a variety of components in required quantities, for example, antirust agents, such as zinc phosphate, iron phosphate, calcium molybdate, vanadium oxide, water-dispersed silica, and fumed silica; organic pigments, such as phthalocyanine organic pigments and condensed polycyclic organic pigments; and inorganic pigments, such as titanium oxide, zinc oxide, calcium carbonate, barium sulfate, alumina, and carbon black.

The coating material of the present invention may be applied onto a substrate with any coating system that is generally used, such as bar coater coating, Meyer bar coating, air knife coating, gravure coating, reverse gravure coating, micro gravure coating, micro reverse gravure coater coating, die coater coating, slot die coater coating, vacuum die coater coating, dip coating, spin coating, spray coating, and brush coating. Preferred are roll coating and spray coating.

<Cured Body>

A cured body of the present invention refers to a cured body obtained by curing the above-described composition. The cured body of the present invention has a high refractive index of 1.580 or higher when measured using multiwavelength Abbe refractometer DR-M2 (manufactured by Atago Co., Ltd.) at a wavelength of 589 nm and a temperature of 23° C. Moreover, the cured body of the present invention preferably has a high refractive index of 1.585 or higher, and more preferably a high refractive index of 1.590 or higher.

A cured body in one aspect of the present invention comprises:

(A) a polymer including a structural unit derived from a (meth)acrylate represented by General formula (1), or

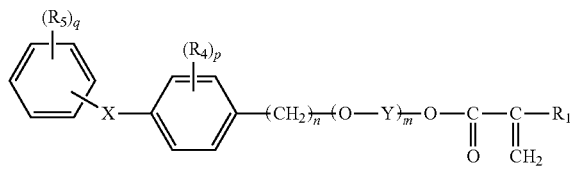
(1)

a copolymer including a structural unit derived from a (meth)acrylate represented by General formula (1) and a structural unit derived from a polyvalent vinyl monomer represented by General formula (3):

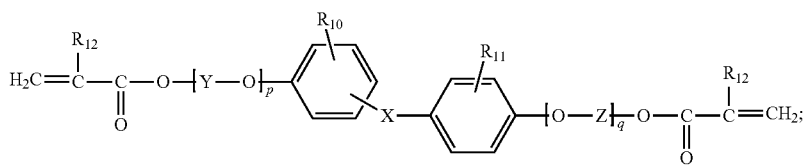
(3)

and
(B) a compound represented by General formula (2),

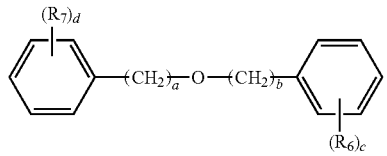
(2)

wherein, the mass ratio between the structural unit derived from a (meth)acrylate represented by General formula (1) and the compound represented by General formula (2) is more than 60:40 and less than 90:10.

Here, X, Y, $R_1$, $R_4$, $R_5$, m, n, p and q in General formula (1) are the same as those of the composition of the present invention. Moreover, $R_6$, $R_7$, a, b, c and d in General formula (2) as well as $R_{10}$, $R_{11}$, $R_{12}$, X, Y, Z, p and q in General formula (3) are also the same as those of the composition of the present invention.

The structural unit derived from a (meth)acrylate represented by General formula (1) refers to a structural unit having the structure of Formula (1a) below,

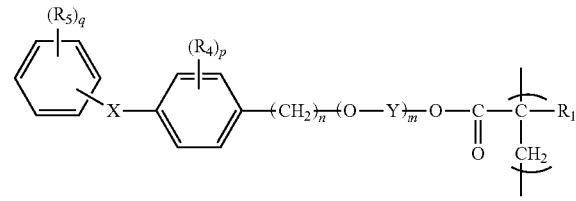
(1a)

and the structural unit derived from a polyvalent vinyl monomer represented by General formula (3) refers to a structural unit having the structure of Formula (3a) below.

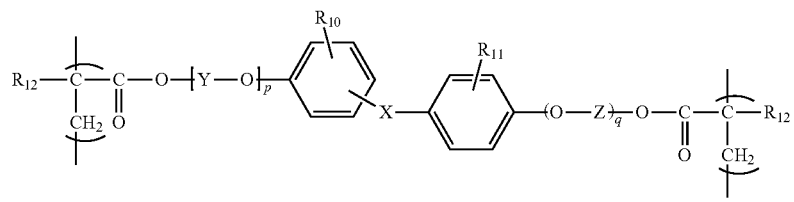
(3a)

Here, X, Y, $R_1$, $R_4$, $R_5$, m, n, p and q in General formula (1a) correspond to those in General formula (1), and $R_{10}$, $R_{11}$, $R_{12}$, X, Y, Z, p and q in General formula (3a) correspond to those in General formula (3).

As described above, the cured body of the present invention can be obtained by curing the composition of the present invention. The method of curing is not particularly limited, and curing can be conducted by any of the various known methods. For example, the composition of the present invention may be cured by irradiating it with an active energy ray, i.e., by photopolymerization. Herein, an "active energy ray" refers to ultraviolet light, an electron beam, an ion beam, an X-ray and the like.

When the composition of the present invention is cured by active energy rays, a photopolymerization initiator is not necessarily needed. However, in the case of using a photopolymerization initiator, examples of the initiator include Irgacure (registered trademark) 2959 (1-[4-(2-hydroxyethoxy)phenyl]-2-hydroxy-2-methyl-1-propan-1-one, Irgacure (registered trademark) 184 (1-hydroxycyclohexyl phenyl ketone), Irgacure (registered trademark) 500 (1-hydroxycyclohexyl phenyl ketone, benzophenone), Irgacure (registered trademark) 651 (2,2-dimethoxy-1,2-diphenylethan-1-one), Irgacure (registered trademark) 369 (2-benzyl-2-dimethylamino-1-(4-morpholinophenyl)butanone-1), Irgacure (registered trademark) 907 (2-methyl-1 [4-methylthiophenyl]-2-morpholinopropan-1-one, Irgacure (registered trademark) 819 (bis(2,4,6-trimethylbenzoyl)-phenylphosphine oxide, Irgacure (registered trademark) 1800 (bis(2,6-dimethoxybenzoyl)-2,4,4-trimethyl-pentylphosphine oxide, 1-hydroxy-cyclohexyl-phenyl-ketone), Irgacure (registered trademark) 1800 (bis(2,6-dimethoxybenzoyl)-2,4,4-trimethyl-pentylphosphine oxide, 2-hydroxy-2-methyl-1-phenyl-1-propan-1-one), Irgacure (registered trademark) OXE01 (1,2-octanedione, 1-[4-(phenylthio)phenyl]-2-(O-benzoyloxime), Darocur (registered trademark) 1173 (2-hydroxy-2-methyl-1-phenyl-1-propan-1-one), Darocur (registered trademark) 1116, 1398, 1174, and 1020, and CGI242 (ethanone, 1-[9-ethyl-6-(2-methylbenzoyl)-9H-carbazol-3-yl]-1-(O-acetyloxime) available from Ciba Specialty Chemicals Inc.; Lucirin TPO (2,4,6-trimethylbenzoyl diphenylphosphine oxide) and Lucirin TPO-L (2,4,6-trimethylbenzoyl ethoxyphenylphosphine oxide) available from BASF; ESACURE 1001M (1-[4-benzoyl phenylsulfanil]phenyl]-2-methyl-2-(4-methylphenylsulfonyl)propan-1-one available from DKSH Japan; Adekaoptomer (registered trademark) N-1414 (carbazole/phenone series), Adekaoptomer (registered trademark) N-1717 (acridine series), and Adekaoptomer (registered trademark) N-1606 (triazine series) available from ADEKA Corporation; TFE-triazine (2-[2-(furan-2-yl)vinyl]-4,6-bis(trichloromethyl)-1,3,5-triazine) manufactured by Sanwa Chemical Co., Ltd.; TME-triazine (2-[2-(5-methylfuran-2-yl)vinyl]-4,6-bis(trichloromethyl)-1,3,5-triazine) manufactured by Sanwa Chemical Co., Ltd.; MP-triazine (2-(4-methoxyphenyl)-4,6-bis(trichloromethyl)-1,3,5-triazine) manufactured by Sanwa Chemical Co., Ltd.; TAZ-113 (2-[2-(3,4-dimethoxyphenyl)ethenyl]-4,6-bis(trichloromethyl)-1,3,5-triazine) manufactured by Midori Chemical Co., Ltd.; and TAZ-108 (2-(3,4-dimethoxyphenyl)-4,6-bis(trichloromethyl)-1,3,5-triazine) manufactured by Midori Chemical Co., Ltd.; and benzophenone, 4,4'-bis(diethylamino) benzophenone, methyl-2-benzophenone, 4-benzoyl-4'-methyldiphenyl sulfide, 4-phenylbenzophenone, ethyl Michler's ketone, 2-chlorothioxanthone, 2-methylthioxanthone, 2-isopropylthioxanthone, 4-isopropylthioxanthone, 2,4-diethylthioxanthone, 1-chloro-4-propoxythioxanthone, 2-methylthioxanthone, thioxanthone ammonium salt, benzoin, 4,4'-dimethoxybenzoin, benzoin methyl ether, benzoin ethyl ether, benzoin isopropyl ether, benzoin isobutyl ether, benzyl dimethyl ketal, 1,1,1-trichloroacetophenone, diethoxyacetophenone, dibenzosuberone, methyl o-benzoylbenzoate, 2-benzoyl naphthalene, 4-benzoyl biphenyl, 4-benzoyl diphenyl ether, 1,4-benzoyl benzene, benzyl, 10-butyl-2-chloroacridone, [4-(methylphenylthio)phenyl] phenylmethane), 2-ethylanthraquinone, 2,2-bis(2-chlorophenyl) 4,5,4',5'-tetrakis(3,4,5-trimethoxyphenyl) 1,2'-biimidazole, 2,2-bis(o-chlorophenyl) 4,5,4',5'-tetraphenyl-1, 2'-biimidazole, tris(4-dimethylaminophenyl)methane, ethyl-4-(dimethylamino) benzoate, 2-(dimethylamino)ethyl benzoate, and butoxyethyl-4-(dimethylamino) benzoate. These photopolymerization initiators may be used singly or in combinations of two or more thereof. The amount of such a photopolymerization initiator in the composition is 0.01% to 15% by mass and preferably 0.1% to 10% by mass.

EXAMPLES

The present invention will now be described in detail with reference to Examples, but the technical scope of the present invention is not limited to the following Examples. The terms "part(s)" and "%" in Examples refer to "part(s) by mass" and "% by mass", respectively.

The physical properties in Examples and Comparative Examples were measured as follows.

1. Viscosity of Composition

The viscosity of each composition prepared as described below was measured with an E-type viscometer (model TV-22) at a measurement temperature of 25° C.

2. Refractive Index of Composition

Each composition prepared as described below was subjected to measurement with a multiwavelength Abbe refractometer DR-M2 (manufactured by Atago Co., Ltd.) at a measurement wavelength of 589 nm and a measurement temperature of 23° C.

3. Refractive Index of Cured Product

The cured material of each composition prepared as described below was subjected to measurement with a multiwavelength Abbe refractometer DR-M2 (manufactured by Atago Co., Ltd.) at a measurement wavelength of 589 nm and a measurement temperature of 23° C.

4. Glass Transition Temperature

Glass transition temperature of the cured body of each of the compositions obtained by the methods described below was measured using DSC6200 (manufactured by Seiko Instruments Inc.) in accordance with JIS-K-7121.

5. Production of Compounds Used in Examples

Production Example 1

In an air atmosphere, 90 g of biphenylmethyl alcohol, 156 g of methyl acrylate, 0.4 g of 4-methoxyphenol as a polymerization inhibitor, and 0.82 g of titanium tetraisopropoxide as a transesterification catalyst were placed in a 500-ml separable flask and stirred at 90° C. for 6 hours. During this step, the generated methanol was removed from the system. After cooling, 10 g of purified water was added to hydrolyze the catalyst, which was followed by distillation to remove the water content and methyl acrylate. Thereafter, the precipitate was filtered to isolate 4-phenylbenzyl acrylate. The yield was 99.5%.

Production Example 2

In a nitrogen atmosphere, 10 g of biphenylmethyl alcohol, 0.1 g of para-toluene sulfonic acid and 90 g of methylcyclohexane were placed in a 300 ml separable flask, and stirred at 105° C. for 18 hours. During this step, water was removed from the system. After cooling, solid precipitate was washed with water and methanol, and filtered to isolate 4,4'-oxybis(methylene)dibiphenyl. The yield was 82%.

Example A: Evaluation of Effects of Compounds Represented by General Formula (2) on Composition In order to evaluate the properties of the composition obtained by mixing the compound represented by General formula (2) with the (meth)acrylate represented by General formula (1) in a predetermined mass ratio, compositions of Example A1 and Comparative example A1 were obtained as follows.

First, as a (meth)acrylate represented by General formula (1), 4-phenylbenzyl acrylate represented by the following formula:

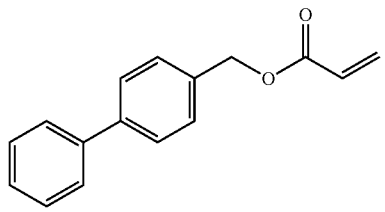

was prepared according to Production example 1, thereby obtaining a composition of Comparative example A1. Subsequently, as the compound represented by General formula (2), 4,4'-oxybis(methylene)dibiphenyl represented by the following formula:

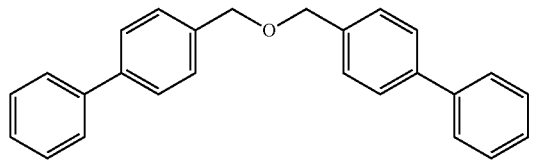

was prepared according to Production example 2 and added to 4-phenylbenzyl acrylate in a mass ratio of 80:20, thereby obtaining a composition of Example A1. Refractive indices and viscosity as well as crystal precipitation of the compositions of Comparative example A1 and Example A1 were evaluated. Crystal precipitation was evaluated by placing the composition in a thermostatic bath set to 5° C. to see whether or not crystal precipitation can be confirmed visually after a month. In addition, the compositions of Comparative example A1 and Example A1 were cooled to 0° C. to confirm their melting points (freezing points) (as determined with a differential scanning calorimeter (DSC)). Since the composition of Example A1 did not freeze, its melting point was unverifiable at a temperature higher than or equal to 0° C. The results are shown in Table 1 below.

TABLE 1

Effects of compounds represented by General formula (2) on composition

| | | Comparative example A1 | Example A1 |
|---|---|---|---|
| Properties of composition | Mass ratio[*1] | 100:0 | 80:20 |
| | Refractive index | 1.5920 | 1.6038 |
| | Viscosity (mPa · s/25° C.) | 18 | 32 |
| | Melting point (° C.) (confirmed at ≥0° C.) | 32 | Did not crystallize |
| | Crystal precipitation | Present | Absent |

[*1]Mass ratio refers to the mass ratio between the content of the (meth)acrylate represented by General formula (1) and the content of the compound represented by General formula (2)

Example B: Evaluations of Compositions Further Comprising Compound Represented by General Formula (3) and Cured Bodies Thereof In addition to 4-phenylbenzyl acrylate represented by General formula (1) and 4,4'-oxybis(methylene)dibiphenyl represented by General formula (2), a compound represented by following formula:

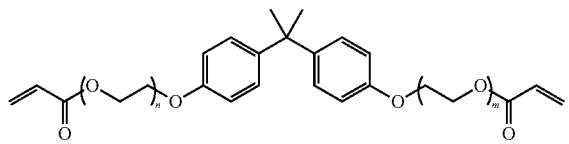

(wherein, m+n=4) (A-BPE-4 manufactured by Shin-Nakamura Chemical Co., Ltd.) was further added as the compound represented by General formula (3), thereby obtaining compositions (Example B1 and Comparative example B1). Moreover, each of the compositions was irradiated with ultraviolet light using a conveyor-type UV irradiation apparatus U-0303 (manufactured by GS Yuasa Corporation, provided with a high-pressure mercury lamp, lamp output: 80 W/cm, conveyor speed: 3 m/min) which was set to an UV irradiation level that results integrated irradiance of 500 mj/cm$^2$, thereby obtaining a cured body. The compositions and properties are summarized in Table 2 below.

TABLE 2

Evaluations of compositions further comprising compound represented by General formula (3) and cured bodies thereof

| | | Example B1 | Comparative example B1 |
|---|---|---|---|
| Properties of composition | Mass ratio[*1] | 50:40:10 | 100:0:0 |
| | Viscosity (Pa · s/25° C.) | 155 | 1100 |
| Properties of cured body | Refractive index | 1.598 | 1.560 |
| | Glass transition temperature (° C.) | 56.1 | 86.6 |
| | Crystal precipitation | Absent | Absent |

[*1]Mass ratio refers to the mass ratio ((3):(1):(2)) between the polyvalent vinyl monomer represented by General formula (3), the (meth)acrylate represented by General formula (1) and the compound represented by General formula (2)

Next, 9,9-bis[4-(2-(meth)acryloyloxyethoxy)phenyl]fluorene represented by the following formula:

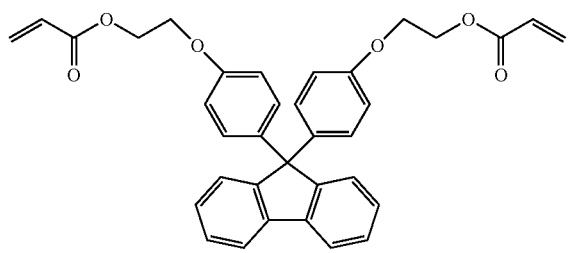 [SMILES: C=CC(=O)OCCOc1ccc(C2(c3ccc(OCCOC(=O)C=C)cc3)c3ccccc3-c3ccccc32)cc1]

was added as the compound represented by General formula (3), thereby obtaining compositions in the same manner as Example B1, Comparative example B1 and Comparative example B2 (Example B2, Example B3 and Comparative example B3). In addition, 9,9-bis[4-(2-(meth)acryloyloxyethoxy)phenyl]fluorene by itself was also prepared as Comparative example B4. Properties of each composition were measured and crystal precipitation was evaluated as well. Crystal precipitation was evaluated by placing the composition in a thermostatic bath set to 5° C. to see whether or not crystal precipitation can be confirmed visually after a month. Moreover, each of the compositions was irradiated with ultraviolet light using a conveyor-type UV irradiation apparatus U-0303 (manufactured by GS Yuasa Corporation, provided with a high-pressure mercury lamp, lamp output: 80 W/cm, conveyor speed: 3 m/min) which was set to an UV irradiation level that results integrated irradiance of 500 mj/cm$^2$, thereby obtaining cured a body. The composition and properties of each composition are summarized in Table 3 below.

TABLE 3

Evaluations of compositions further comprising compound represented by General formula (3) and cured bodies thereof

| | | Example B2 | Example B3 | Comparative example B3 | Comparative example B4 |
|---|---|---|---|---|---|
| Properties of composition | Mass ratio*1 | 30:56:14 | 50:40:10 | 50:50:0 | 100:0:0 |
| | Refractive index | 1.606 | 1.611 | 1.608 | 1.622 |
| | Viscosity (Pa · s/25° C.) | 200 | 2050 | 1900 | 91.000 (Pa · s/ 60° C.) |
| | Crystal precipitation | Absent | Absent | Present | Present |
| Properties of cured body | Refractive index | 1.630 | 1.634 | 1.631 | 1.644 |
| | Glass transition temperature (° C.) | 66 | 95.5 | 100 | Not determined |

*1Mass ratio refers to the mass ratio ((3):(1):(2)) between the polyvalent vinyl monomer represented by General formula (3), the (meth)acrylate represented by General formula (1) and the compound represented by General formula (2)

Example C: Evaluation of Ratios and Properties of Compound Represented by General Formula (2)

With respect to the composition containing the (meth)acrylate represented by General formula (1) and the compound represented by General formula (2), relationship between the mass ratio and the properties of these compounds was evaluated by preparing multiple test samples containing the (meth)acrylate represented by General formula (1) and the compound represented by General formula (2) in varied mass ratios (Examples C1 and C2, and Comparative examples C1, C2 and C3). 4-phenylbenzyl acrylate was used as the (meth)acrylate represented by General formula (1) and 4,4'-oxybis(methylene)dibiphenyl was used as the compound represented by General formula (2). Refractive indices and crystal precipitation of the compositions of these examples and comparative examples were evaluated. Crystal precipitation was evaluated by placing the composition in a thermostatic bath set to 5° C. to see whether or not crystal precipitation can be confirmed visually after a month. The results are shown in Table 4 below.

TABLE 4

Evaluation of ratio and properties of compound represented by General formula (2)

| | Mass ratio*1 | Refractive index | Viscosity (mPa · s/ 25° C.) | Crystal precipitation |
|---|---|---|---|---|
| Comparative example C1 | 100:0 | 1.5920 | 18 | Present |
| Comparative example C2 | 90:10 | 1.5964 | 22 | Present |
| Example C1 | 80:20 | 1.6038 | 32 | Absent |
| Example C2 | 70:30 | 1.6096 | 47 | Absent |
| Comparative example C3 | 60:40 | 1.6155 | 70 | Present |

*1Mass ratio refers to the mass ratio between the content of the (meth)acrylate represented by General formula (1) and the content of the compound represented by General formula (2)

The above results show that crystal precipitation can be suppressed effectively while retaining a high refractive index if the mass ratio between the content of the (meth)acrylate represented by General formula (1) and the content of the compound represented by General formula (2) is more than 60:40 and less than 90:10.

Example D: Evaluation of Effects of Various Compounds Represented by General Formula (2)

The following compounds, i.e., (2A: oxydibenzene), (2B: oxybis(methylene)dibenzene) and (2C: 4,4'-oxybis(methylene)dibiphenyl), were used as the compounds represented by General formula (2) for evaluation.

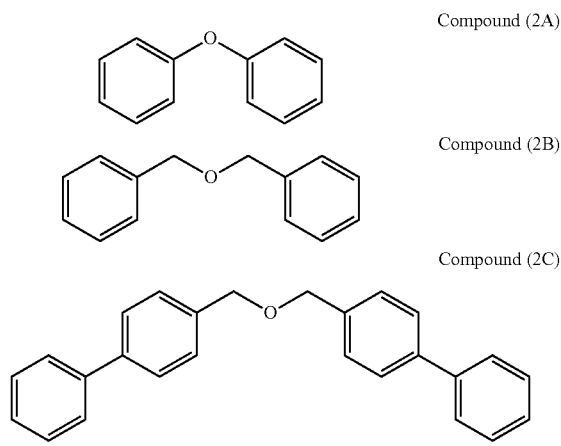

Similar to Example A, 4-phenylbenzyl acrylate was used as the (meth)acrylate represented by General formula (1) to be blended with Compound (2A), (2B) or (2C) in the mass ratio shown in Table 5 below. The mass ratio "(1):(2A)=80:20" in Table 5 means that the mass ratio between 4-phenylbenzyl acrylate and Compound (2A) in the blend of these compounds is 80:20. The same also applies to Compounds (2B) and (2C). The refractive index and crystal precipitation of the resulting compositions were evaluated, and the results are summarized in Table 5. Crystal precipitation was evaluated by placing the composition in a thermostatic bath set to 5° C. to see whether or not crystal precipitation can be confirmed visually after a month. Furthermore, since Compounds (2A) and (2B) were both liquid at room temperature, the compositions of Examples D1 and D2 both had viscosity lower than or equal to that of 4-phenylbenzyl acrylate.

TABLE 5

Evaluation of effect of compounds represented by General formula (2)

|  | Mass ratio | Refractive index | Viscosity (mPa · s/25° C.) | Crystal precipitation |
|---|---|---|---|---|
| Example D1 | (1):(2A) = 80:20 | 1.5870 | 12 | Absent |
| Example D2 | (1):(2B) = 80:20 | 1.5828 | 13 | Absent |
| Example D3 | (1):(2C) = 80:20 | 1.6038 | 32 | Absent |
| Comparative example D1 | (1):(2A) = 0:100 | 1.5781 | <10 | Absent (liquid) |
| Comparative example D2 | (1):(2B) = 0:100 | 1.5611 | <10 | Absent (liquid) |
| Comparative example D3 | (1):(2C) = 0:100 | 1.6399 | Unable to determine | — (Solid at room temperature) |

The above results show that crystal precipitation can be suppressed effectively while retaining a high refractive index when these compounds were used as the compound represented by General formula (2). Compounds (2A) and (2B) were both liquid at 5° C. and did not precipitate a crystal by themselves but Compound (2C) was solid at 5° C. by itself. Surprisingly and unexpectedly, even when Compound (2C) that was solid at a low temperature was used, crystal precipitation of the composition of the present invention was suppressed effectively.

Example E: Evaluation of Effects of Compounds Represented by General Formula (2) on Compositions Compositions of Examples E1 and E2 shown in Table 6 were obtained in the same manner as that of Example A except that the ratio between the compound represented by General formula (2) and the (meth)acrylate represented by General formula (1) was changed. Refractive indices and viscosity as well as crystal precipitation of compositions of Examples E1 and E2 were evaluated. Crystal precipitation was evaluated by placing the composition in a thermostatic bath set to 5° C. to see whether or not crystal precipitation can be confirmed visually after a month. In addition, the compositions of Examples E1 and E2 were cooled to 0° C. to confirm their melting points (freezing points) (as determined with a differential scanning calorimeter (DSC)). Since the compositions of Examples E1 and E2 did not freeze, their melting points were unverifiable at a temperature higher than or equal to 0° C. The results are shown in Table 6 below.

TABLE 6

Effects of compounds represented by General formula (2) on compositions

|  |  | Example E1 | Example E2 |
|---|---|---|---|
| Properties of composition | Mass ratio[*1] | 86:14 | 84:16 |
|  | Refractive index | 1.598 | 1.600 |
|  | Viscosity (mPa · s/25° C.) | 27 | 29 |
|  | Melting point (° C.) (confirmed at ≥0° C.) | Did not crystallize | Did not crystallize |
|  | Crystal precipitation | Absent | Absent |

[*1]Mass ratio refers to the mass ratio between the content of the (meth)acrylate represented by General formula (1) and the content of the compound represented by General formula (2)

Example F: Evaluations of Compositions Further Comprising Compound Represented by General Formula (3) and Cured Bodies Thereof Compositions of Examples F1 and F2 shown in Table 7 were obtained in the same manner as that of Example B except that the ratio between the compound represented by General formula (2) and the (meth)acrylate represented by General formula (1) was changed. As the compound represented by General formula (3), 9,9-bis[4-(2-(meth)acryloyloxyethoxy)phenyl]fluorene was used. Properties of each composition were measured and crystal precipitation was evaluated. Crystal precipitation was evaluated by placing the composition in a thermostatic bath set to 5° C. to see whether or not crystal precipitation can be confirmed visually after a month. Moreover, each of the compositions was irradiated with ultraviolet light using a conveyor-type UV irradiation apparatus U-0303 (manufactured by GS Yuasa Corporation, provided with a high-pressure mercury lamp, lamp output: 80 W/cm, conveyor speed: 3 m/min) which was set to an UV irradiation level that results integrated irradiance of 500 mj/cm$^2$, thereby obtaining cured a body. The compositions and properties are summarized in Table 7 below.

TABLE 7

Evaluations of compositions further comprising compound represented by General formula (3) and cured bodies thereof

|  |  | Example F1 | Example F2 |
|---|---|---|---|
| Properties of composition | Mass ratio[*1] | 50:43:7 | 50:42:8 |
|  | Refractive index | 1.610 | 1.610 |
|  | Viscosity (mPa · s/25° C.) | 1990 | 1980 |
|  | Crystal precipitation | Absent | Absent |
| Properties of cured body | Refractive index | 1.632 | 1.633 |
|  | Glass transition temperature (° C.) | 98 | 98 |

[*1]Mass ratio refers to the mass ratio ((3):(1):(2)) between the polyvalent vinyl monomer represented by General formula (3), the (meth)acrylate represented by General formula (1) and the compound represented by General formula (2)

Example G: Evaluation of Ratios and Properties of Compound Represented by General Formula (2)

Compositions of Examples G1 and G2 shown in Table 8 were obtained in the same manner as that of Example C except that the ratio between the compound represented by General formula (2) and the (meth)acrylate represented by General formula (1) was changed. 4-phenylbenzyl acrylate was used as the (meth)acrylate represented by General formula (1) while 4,4'-oxybis(methylene)dibiphenyl was used as the compound represented by General formula (2).

Refractive indices and crystal precipitation of compositions of these examples were evaluated. Crystal precipitation was evaluated by placing the composition in a thermostatic bath set to 5° C. to see whether or not crystal precipitation can be confirmed visually after a month. The results are shown in Table 8 below.

TABLE 8

| | Evaluation of ratio and properties of compound represented by General formula (2) | | | |
|---|---|---|---|---|
| | Mass ratio[*1] | Refractive index | Viscosity (mPa · s/25° C.) | Crystal precipitation |
| Example G1 | 86:14 | 1.598 | 27 | Absent |
| Example G2 | 84:16 | 1.600 | 29 | Absent |

[*1]Mass ratio refers to the mass ratio between the content of the (meth)acrylate represented by General formula (1) and the content of the compound represented by General formula (2)

The invention claimed is:

1. A composition comprising:

(A) a (meth)acrylate represented by General formula (1) below:

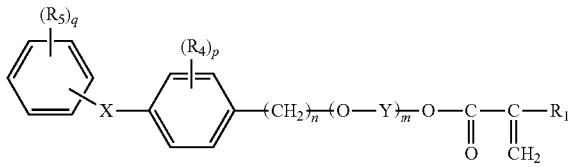

(1)

wherein

X is a single bond or a divalent group selected from the group consisting of —C($R_2$)($R_3$)—, —C(=O)—, —O—, —OC(=O)—, —OC(=O)O—, —S—, —SO—, —SO$_2$— and any combination thereof; wherein, $R_2$ and $R_3$ are each independently a hydrogen atom, a linear alkyl group having 1 to 10 carbon atoms, a branched alkyl group having 3 to 10 carbon atoms, a cyclic alkyl group having 3 to 10 carbon atoms, a linear alkoxy group having 1 to 10 carbon atoms, a branched alkoxy group having 3 to 10 carbon atoms, a cyclic alkoxy group having 3 to 10 carbon atoms, a phenyl group or a biphenyl group; or $R_2$ and $R_3$ are optionally linked to each other to, together with the carbon atom to which they are attached, form a cyclic alkyl group having 3 to 10 carbon atoms;

Y is an optionally branched alkylene group having 2 to 6 carbon atoms, a cycloalkylene group having 6 to 10 carbon atoms or an arylene group having 6 to 10 carbon atoms;

$R_1$ is a hydrogen atom or a methyl group;

$R_4$ and $R_5$ are each independently a linear alkyl group having 1 to 10 carbon atoms, a branched alkyl group having 3 to 10 carbon atoms, a cyclic alkyl group having 3 to 10 carbon atoms, a linear alkoxy group having 1 to 10 carbon atoms, a branched alkoxy group having 3 to 10 carbon atoms, a cyclic alkoxy group having 3 to 10 carbon atoms, a halogen atom, a phenyl group or a biphenyl group;

m is an integer of 0 to 10;

n is an integer of 1 to 2;

p is an integer of 0 to 4; and q is an integer of 0 to 5; and (B) a compound represented by General formula (2) below:

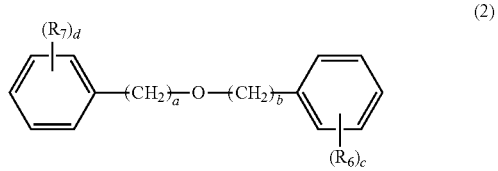

(2)

wherein $R_6$ and $R_7$ are each independently a hydrogen atom, a linear alkyl group having 1 to 10 carbon atoms, a branched alkyl group having 3 to 10 carbon atoms, a cyclic alkyl group having 3 to 10 carbon atoms, a linear alkoxy group having 1 to 10 carbon atoms, a branched alkoxy group having 3 to 10 carbon atoms, a cyclic alkoxy group having 3 to 10 carbon atoms, a halogen atom, a phenyl group, a biphenyl group, a phenoxy group, —$R_8$OH or —($R_9$)$_s$H; wherein, $R_8$ is a linear alkylene group having 1 to 10 carbon atoms or a branched alkylene group having 3 to 10 carbon atoms, $R_9$ is a linear alkyleneoxy group having 1 to 10 carbon atoms or a branched alkyleneoxy group having 3 to 10 carbon atoms, and s is an integer of 1 to 5;

a and b are each independently an integer of 0 to 10; and c and d are each independently an integer of 0 to 5;

wherein the mass ratio between the content of the (meth)acrylate represented by General formula (1) and the content of the compound represented by General formula (2) is more than 60:40 and less than 90:10.

2. The composition according to claim 1, wherein p and q in General formula (1) above are both 0.

3. The composition according to claim 1, wherein the mass ratio between the content of the (meth)acrylate represented by General formula (1) and the content of the compound represented by General formula (2) is 65:35 to 85:15.

4. The composition according to claim 1, wherein a and b in General formula (2) above are each an integer of 0 to 5.

5. The composition according to claim 1, wherein $R_6$ and $R_7$ in General formula (2) above are each a phenyl group, a biphenyl group or a phenoxy group.

6. The composition according to claim 5, wherein a, b, c and d in General formula (2) above are all 1.

7. The composition according to claim 1, further comprising a polyvalent vinyl monomer copolymerizable with the (meth)acrylate represented by General formula (1) above and represented by General formula (3) below:

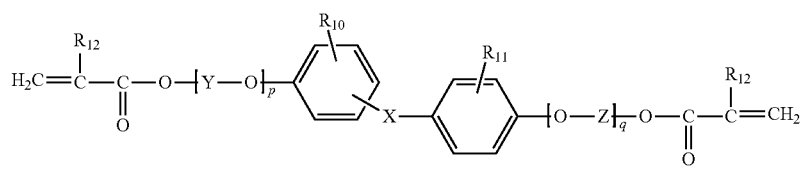

(3)

wherein
- $R_{10}$ and $R_{11}$ are each independently selected from a hydrogen atom, an alkyl group having 1 to 20 carbon atoms, an alkoxyl group having 1 to 20 carbon atoms, a cycloalkyl group having 3 to 20 carbon atoms, a cycloalkoxyl group having 5 to 20 carbon atoms, an aryl group having 6 to 20 carbon atoms, an aryloxy group having 6 to 20 carbon atoms or a halogen atom;
- $R_{12}$ is a hydrogen atom or a methyl group;
- X represents any structure selected from the group consisting of a single bond, —O—, —S—, —SO—, —SO$_2$—, —CO— and those represented by General formulae (4) to (7) below;
- Y and Z are each independently an optionally branched alkylene group having 2 to 6 carbon atoms, a cycloalkylene group having 6 to 10 carbon atoms or an arylene group having 6 to 10 carbon atoms, and
- p and q are each independently an integer of 0 to 4;

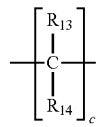

(4)

wherein
- $R_{13}$ and $R_{14}$ each independently represent any one of the group consisting of a hydrogen atom, a halogen atom, an alkyl group having 1 to 20 carbon atoms optionally having a substituent, an alkoxy group having 1 to 5 carbon atoms optionally having a substituent, an aryl group having 6 to 12 carbon atoms optionally having a substituent, an alkenyl group having 2 to 5 carbon atoms optionally having a substituent and an aralkyl group having 7 to 17 carbon atoms optionally having a substituent;
- the substituents are each independently a halogen atom, an alkyl group having 1 to 20 carbon atoms or an aryl group having 6 to 12 carbon atoms, and
- c represents an integer of 1 to 20;

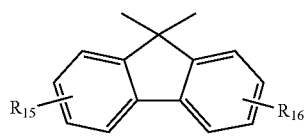

(5)

wherein $R_{15}$ and $R_{16}$ each independently represent any one of the group consisting of a hydrogen atom, a halogen atom, an alkyl group having 1 to 20 carbon atoms optionally having a substituent, an alkoxy group having 1 to 5 carbon atoms optionally having a substituent, an aryl group having 6 to 12 carbon atoms optionally having a substituent, an alkenyl group having 2 to 5 carbon atoms optionally having a substituent and an aralkyl group having 7 to 17 carbon atoms optionally having a substituent, or $R_{15}$ and $R_{16}$ are linked each other to form a carbocyclic or heterocyclic ring having 1 to 20 carbon atoms; and
the substituents are each independently a halogen atom, an alkyl group having 1 to 20 carbon atoms or an aryl group having 6 to 12 carbon atoms;

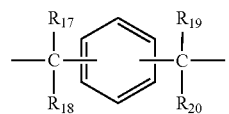

(6)

wherein $R_{17}$-$R_{20}$ each independently represent any one of the group consisting of a hydrogen atom, a halogen atom, an alkyl group having 1 to 20 carbon atoms optionally having a substituent, an alkoxy group having 1 to 5 carbon atoms optionally having a substituent, an aryl group having 6 to 12 carbon atoms optionally having a substituent, an alkenyl group having 2 to 5 carbon atoms optionally having a substituent and an aralkyl group having 7 to 17 carbon atoms optionally having a substituent, or $R_{17}$ and $R_{18}$, and $R_{19}$ and $R_{20}$ are linked each other to form a carbocyclic or heterocyclic ring having 1 to 20 carbon atoms; and
the substituents are each independently a halogen atom, an alkyl group having 1 to 20 carbon atoms or an aryl group having 6 to 12 carbon atoms; and

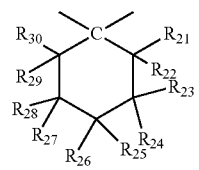

(7)

wherein $R_{21}$-$R_{30}$ are each independently a hydrogen atom or an alkyl group having 1 to 3 carbon atoms.

8. The composition according to claim 7, comprising the polyvalent vinyl monomer represented by General formula (3) in an amount of 20% to 80% by weight relative to the total weight of the composition.

9. The composition according to claim 7, wherein X in General formula (3) above has a structure represented by General formula (4) or a structure represented by General formula (5).

10. The composition according to claim 1, wherein the composition is an active energy ray-curable composition.

11. A coating material comprising the composition according to claim 1.

12. A cured body obtained by curing the composition according to claim 1.

* * * * *